United States Patent
Rebane et al.

[15] 3,645,369
[45] Feb. 29, 1972

[54] UTENSIL POLARIZING APPARATUS

[72] Inventors: George J. Rebane, 3003 N. Auburn Court, Santa Susana, Calif. 93063; Stephen T. Braunheim, 2024 Lombardy Drive, La Canada, Calif. 91011

[22] Filed: May 6, 1970

[21] Appl. No.: 35,137

[52] U.S. Cl. ........................................................193/43 B
[51] Int. Cl. ..........................................................B65g 11/20
[58] Field of Search ........................198/33 AD; 193/43 B; 221/171–173; 209/73, 97

[56] References Cited

UNITED STATES PATENTS 3,545,613  12/1970  Nystuen ...........................198/33 AD
3,106,281  10/1963  Mottin .............................198/33 AD
3,389,790  6/1968   Braunheim et al. ................209/97
2,309,471  1/1943   Moore ..............................193/43 B
3,301,397  1/1967   Stutz ...............................209/73

Primary Examiner—Allen N. Knowles
Attorney—Linval B. Castle

[57] ABSTRACT

Apparatus for receiving and polarizing utensils that have been sorted as to type. The sorting may be accomplished by passing them over a shield containing sorting slots of increasing lengths through which the utensils drop according to their length. From the sorting slots the utensils pass into the polarizers which automatically turn the utensil so that it will pass handle first into the storage bin.

3 Claims, 5 Drawing Figures

PATENTED FEB 29 1972
3,645,369
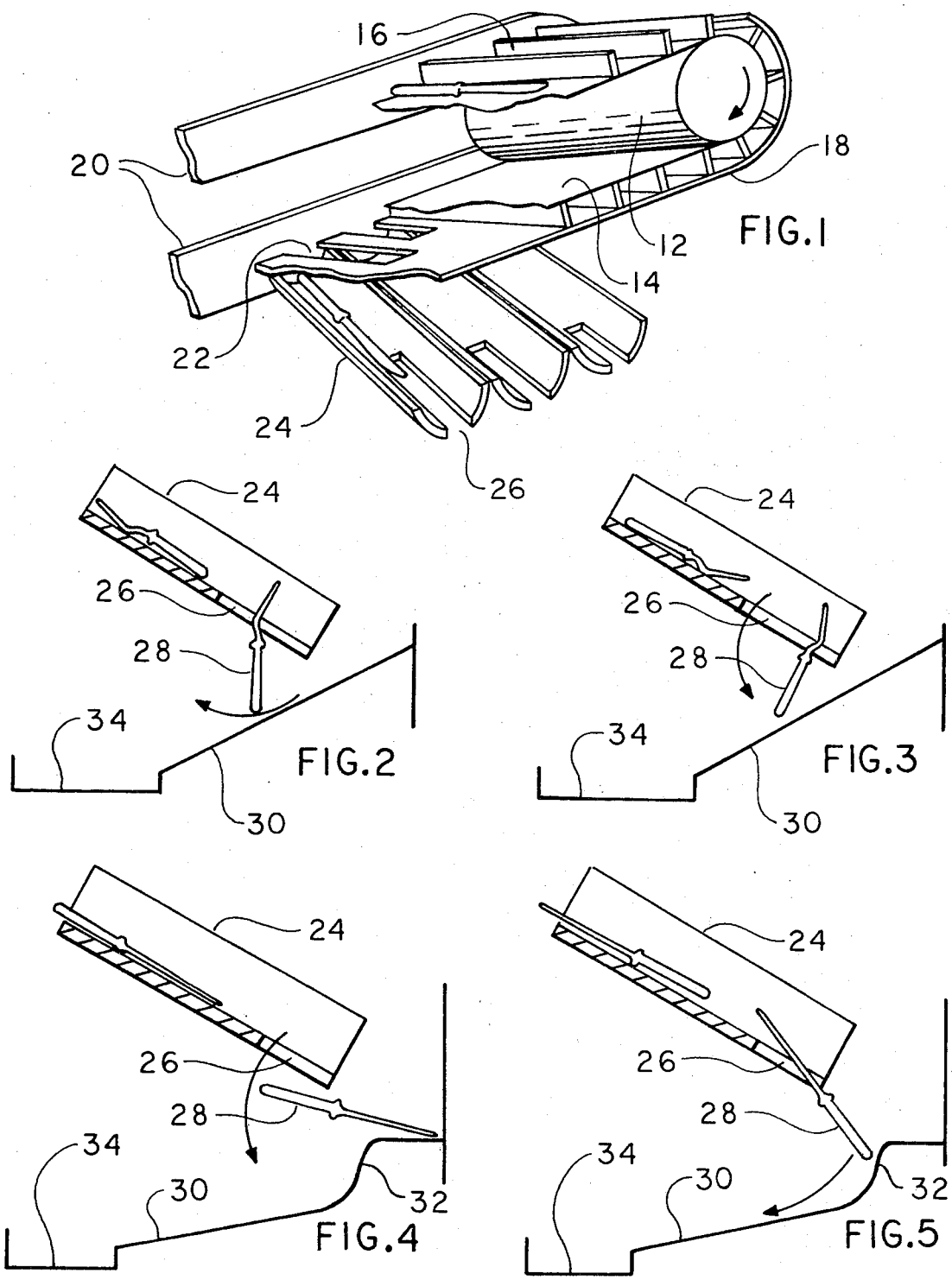
INVENTORS
Stephen T. Braunheim
George J. Rebane
BY

UTENSIL POLARIZING APPARATUS

CROSS-REFERENCE

The utensil polarizing apparatus disclosed and claimed herein is related to the utensil sorting equipment described and claimed in U.S. Pat. No. 3,389,790 issued to us on June 25, 1968, in that the utensil polarizers may be used with the sorting equipment described in the related patent and as a substitute for the utensil polarizers described in that patent or may also be used in connection with any other type of utensil sorting apparatus.

As used in the specification, the term "polarizer" refers to apparatus which will place utensils, such as knives, forks, or spoons, in their respective storage bins so that all handles are at one end of the bins.

BACKGROUND OF THE INVENTION

Automatic dishwashing and drying equipment can handle great quantities of tableware utensils, such as used in hotels and restaurants; however, sorting the washed and dried utensils has generally been a manual operation which, depending upon the size of the facility, may require as many as two or more in kitchen help. Complete sorting includes not only sorting the utensils as to type of utensil, but also requires that all handles of each type of utensil are in common alignment in the storage bins. There are several types of devices that can perform the type sorting function; however, to achieve a fast, accurate, and, most important, sanitary utensil sorting, the utensils must also be polarized, that is, turned so that all handles of each utensil will be in common alignment in the bin. The polarizers described and claimed herein perform that function.

U.S. Pat. No. 3,389,790, which was issued to us on June 25, 1968, describes a utensil sorting apparatus in which the utensils are picked up by a rotating drum which has a plurality of fins on the outer periphery and parallel with the axis of the drum. As the drum rotates, the utensils are passed over a shield containing a plurality of sorting slots of various length to match the various lengths of the utensils so that each type of utensil will drop through the slot of appropriate length into the polarizer section.

The present specification describes an alternate system configuration using a conveyor belt which guides the utensils over a shield containing slots similar to those described in our aforementioned patent. Without additional guiding hardware, the polarizers in that prior patent were incapable of turning the various utensils so that all utensils dropped into one storage bin, and was only capable of switching a particular utensil into one of two storage bins, depending upon whether the handle or the working end of the utensil was first passing through the polarizer troughs.

The present invention is for greatly improved utensil polarizers.

SUMMARY OF THE INVENTION

Briefly described, the invention includes utensil polarizers for use with utensil sorting apparatus which sorts the utensils as to type and drops all utensils of one type into a polarizer trough which is tilted at an angle so that the utensils will gravitate toward a slot in the bottom of the trough. This slot has a width greater than the width of the handle of the utensil but narrower than the working end so that the utensil will be rotated as hereinafter described and be polarized so that all similar utensils in a storage bin are properly aligned with their handles at one end of the bin.

BRIEF SUMMARY OF THE DRAWINGS

In the drawings which illustrate a preferred embodiment of the invention:

FIG. 1 is a perspective view showing portions of the conveyor belt system, the shield, and polarizer troughs;

FIG. 2 illustrates the operation of the polarizer containing a handle-first fork or spoon;

FIG. 3 illustrates the operation of the polarizer with a tine-first fork;

FIG. 4 illustrates the operation of a polarizer with a blade-first knife; and

FIG. 5 illustrates the operation of the polarizer with a handle-first knife.

DETAILED DESCRIPTION

FIG. 1 illustrates in broken perspective a utensil sorter comprising a rotatable drum 12 and a conveyor belt 14. Conveyor belt 14 is provided with a plurality of lateral fins 16 for conveying various types of utensils to be sorted. As belt 14 rotates around drum 12, the utensils are retained in position by a shield 18, which is stationary and positioned in close contact to the outer surfaces of fins 16 so that as the utensils are rotated around drum 12, they fall upon shield 18 and are pushed by fins 16.

Shield 18 and drum 12 are tilted at an angle of approximately 20° to the horizontal so that utensils riding upon belt 14 and later upon shield 18 will gravitate to one side of the shield 18 and against indexing rail 20.

Cut into the surface of shield 18 and adjacent indexing rail 20 are a plurality of slots through which utensils will pass to be sorted as to type. The first sorting slot must be the shortest and must be of sufficient length to pass the shortest utensil accommodated by the apparatus. Therefore, as the fins 16 wipe the utensils over the slots, only the shortest utensil will pass through the shortest slot while all others will progress toward longer slots that will accommodate their longer length. The operation of the conveyor belt system and the various length slots in shield 18 is therefore to sort the utensils according to their length.

As the various utensils pass through slots 22 in shield 18, they drop into troughs, the ends of which contain polarizer slots 26. Troughs 24 are preferably semicylindrical and made of a smooth surface material such as polished metal or plastic and are inclined at an angle so that utensils will gravitate toward the polarizer slot 26.

Slot 26 must have a width that is greater than the width of the handle of the utensil but less than the width of the working end of the utensil, as shown in FIG. 1. This type of polarizer, therefore, will accommodate forks and spoons of all sizes and shapes and, as will hereinafter be explained, will also accommodate knives, the handles of which are generally the same width as the blade.

FIG. 2 illustrates either a fork or a spoon gravitating handle first down a semicylindrical trough 24 after having passed through the sorting slots 22 in shield 18. As the utensil slides through the trough 24, its handle 28 drops through the polarizer slot 26 and the utensil rotates clockwise as shown by the arrow in FIG. 2 and drops onto ramp 30 to pass handle first into bin 34.

In FIG. 3 the utensil is gravitating bowl first, or tine first, through trough 24. Since the polarizer slot 26 is narrower than the bowl, or tine, the utensil passes down the trough until the handle 28 again drops through the polarizer slot 26, as shown in FIG. 3. The utensil rotates counterclockwise, as shown by the arrow and the handle 28 strikes ramp 30 before the tine, or bowl, end of the utensil passes over slot 26 and is freed from the trough 24. The utensil, therefore, passes handle first down ramp 30 into bin 34.

The handle of a table knife is generally approximately the same width as the blade of a knife, and a knife polarizer must, therefore, include a deflector plate 32 as shown in FIGS. 4 and 5. In FIG. 4, a knife is gravitating blade first through semicylindrical trough 24 after having passed through an appropriate sorter slot 22 in shield 18. Because the handle 28 of the knife is much heavier than the blade, the blade will not pass through polarizer slot 26 and will continue until it strikes the top surface of deflector plate 32. At this point the handle 28 of the knife is free to drop through the polarizer slot 26 and the knife then passes handle first down ramp 30 into storage bin 34.

FIG. 5 illustrates the knife passing handle first through trough 24. The heavy handle 28 of the knife will drop through the polarizer slot 26, while the blade end is still suspended in the bottom of trough 24. The knife is, therefore, rotated clockwise and passes down ramp 30 into storage bin 34. Some table knives are constructed with hollow handles or with materials that are comparatively light in weight. If the handle is not sufficiently heavy, it may not drop through polarizer slot 26 with sufficient speed to adequately rotate a knife. It is, therefore, advisable to form deflector plate 32 as shown in FIGS. 4 and 5 with a flat top surface positioned to intercept the blade of the knife as shown in FIG. 4 but with a circular concave face which will intercept a lightweight handle 28 of a knife and force it to rotate clockwise, as shown in FIG. 5. This will assure that all knives will pass handle first down into ramp 30 into storage bin 34.

What is claimed is:

1. A polarizer for use with apparatus for sorting utensils as to type, said polarizer comprising:

a trough having a receiving end into which utensils are deposited and a discharge end from which utensils are discharged, said trough being inclined so that utensils will gravitate from the receiving end to the discharge end, said trough having a cross-sectional configuration that forces the utensils to gravitate longitudinally along a path parallel to the longitudinal axis of said trough;

a polarizer slot in a portion of the discharge end of said trough and centered on the path along which the utensils gravitate, said slot having a width greater than the width of the handle of a utensil whereby the handle will drop through said slot before the working end of the utensil passes from the discharge end of said trough; and a ramp positioned beneath the discharge end of said trough and inclined to gravitate utensils received from the discharge end of said trough into a storage means.

2. A polarizer claimed in claim 1 wherein said ramp includes a deflection plate positioned to stop the forward movement of the utensil after passing from the discharge end of said trough.

3. A polarizer claimed in claim 2 wherein said deflection plate includes a flat surface positioned to intercept the blade of a knife passing from the discharge end of said trough, said flat surface being connected to the main body portion of said deflection plate by a circular concave face positioned to intercept and to downwardly deflect the handle of a knife passing from the discharge end of said trough.

* * * * *